Figure 1:
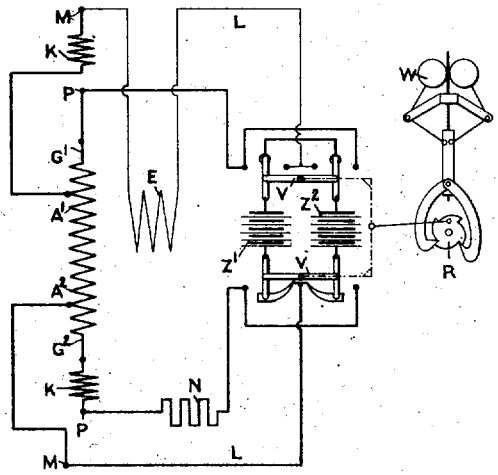

H. GROB.

ELECTRIC CAR LIGHTING SYSTEM.

APPLICATION FILED AUG. 27, 1912.

Reissued June 20, 1916. 14,152.

WITNESSES

INVENTOR

BY

ATTORNEYS

UNITED STATES PATENT OFFICE.

HUGO GROB, OF FÜRSTENWALDE, GERMANY, ASSIGNOR TO SAFETY CAR HEATING & LIGHTING COMPANY, A CORPORATION OF NEW JERSEY.

ELECTRIC CAR-LIGHTING SYSTEM.

14,152. Specification of Reissued Letters Patent. Reissued June 20, 1916.

Original No. 994,510, dated June 6, 1911, Serial No. 371,002. Application for reissue filed August 27, 1912. Serial No. 717,406.

*To all whom it may concern:*

Be it known that I, HUGO GROB, a citizen of the Swiss Confederation, residing at Fürstenwalde, Germany, have invented a new and useful Electric Car-Lighting System; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The subject of the present invention is an apparatus for the electrical illumination of vehicles, the voltage of which is kept constant independently of the number of revolutions and of the amount of current consumed in a purely electrical way, without the use of any mechanism, and the battery of which is automatically recharged during the running of the vehicle. Obviously the current generated by the system may be used also for heating the car, also for cooking, ventilating and other purposes.

The principle on which the pressure or tension is regulated is known and is as follows: When a continuous current generator is connected in parallel with an extraneous source of substantially constant pressure, so that the compensatory current which is eventually produced in the connecting conductors flows through an exciting coil, and in this way causes at least a portion of the excitation of the said generator, be it directly or through the medium of an exciting dynamo, the aforesaid continuous current dynamo possesses the property, as it is well known, of producing a pressure which is almost constant, independent of the load and number of revolutions. It is necessary, however, that the generator or its exciting dynamo should be so constructed, that it requires only a very small exciting force and the exciting coil should consist only of a few windings, so that a very slight difference of pressure in the exciting coil is sufficient to produce the full generator pressure even with the lowest number of revolutions employed. It is easy to understand, that the pressure of the generator cannot, under any circumstances, differ from the extraneous independent pressure by an amount greater than the fall of pressure which the compensatory current, necessary for the production of the generator pressure, produces in the connecting conductor together with the exciting coil. The generator pressure is always slightly lower than the independent pressure, so that the latter supplies the exciting current. If now, from any cause the pressure produced by the generator rises, the difference of pressure producing excitation will immediately fall and consequently also the exciting current, and the dynamo pressure will therefore remain approximately constant, although the number of revolutions or the load may vary. The use of this pressure regulating method alone would not, however, lead to practically useful apparatus for the electrical illumination of vehicles; for this purpose a series of additional features are necessary.

The essential feature of the present invention consists in the combination of the above described pressure regulating method with a number of additional devices, which alone enable this pressure regulating method to be used for illuminating vehicles, as will be fully set forth hereafter.

Figure 1 is a diagram of a vehicle lighting apparatus, and Figs. 2 to 5 illustrate special forms of construction thereof.

In the following description the lighting of trains will be principally dealt with. What is said herein may be applied obviously to heating, cooking, ventilating as well as to the application of the plant to other vehicles.

Like every other train lighting apparatus, the present one also employs a storage battery which, when the train is at a standstill, supplies the illuminating current. This battery must be recharged, while the train is running.

As mentioned at the beginning of this specification, the regulation of pressure may be effected by means of any suitable extraneous source of pressure, or the existing battery may be divided into two halves $Z'$, and $Z^2$, one of which is used to supply the independent extraneous pressure required for the regulation of the pressure, in other words it supplies the exciting current, while the other battery half is charged by the generator. The voltage of a generator, regulated in the manner hereinbefore described, cannot be higher than the extraneous independent pressure, applied so as to oppose the pressure to be regulated, that is to say, in our case, not higher than the pressure of the half of the battery which discharges itself by supplying the exciting compensatory current. The directly regulated pressure cannot therefore suffice to charge the other half of the battery, since a higher pressure is necessary for this purpose. In the present train lighting apparatus this higher pressure is produced in the following novel manner.

Figure 2:
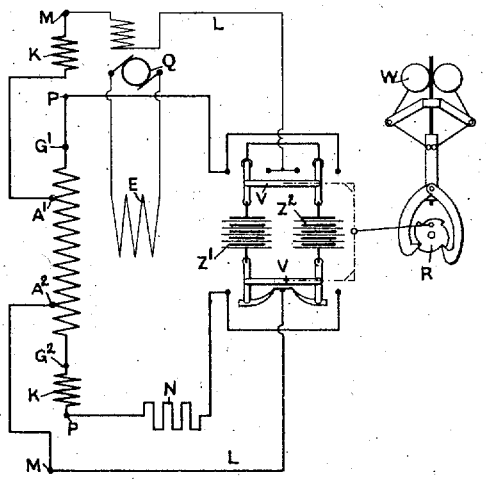

In Fig. 1 the lines G′, A′, A², G², show the entire armature winding of an ordinary continuous current generator. This armature winding may be continuous, as in an ordinary armature, or it may consist of separate windings, each of which has a collector, and the said windings being arranged in series. E is an exciting coil, which causes at least a portion of the excitation of the generator, and which may be placed either directly in the magnetic circuit of the generator (Fig. 1) or in that of an exciting dynamo Q of the generator (Fig. 2). The extraneous independent pressure, *i. e.*, the one half Z′ or Z² of the battery, is connected to two terminals M of the generator, (the regulating exciting coil E being switched in between), between which terminals less than the entire number of armature conductors existing in the generator is in action, so that there exist other machine terminals P, between which there exists a higher pressure than the directly regulated pressure. This higher pressure, which is likewise independent of the number of revolutions, is used to charge the other half of the battery.

The armature reaction field may be eliminated with great advantage in the usual way, by compensation coils K, placed between the poles and traversed by the armature current. The object of this is to obviate the self induction of the armature and thereby to protect the switch contacts from being burned.

The lighting current may be taken from the apparatus either at the terminals M, at discharging pressure or at the points P at battery charging pressure, but in the latter case a resistance must be placed in the lighting circuit, which resistance absorbs the difference between the charging pressure and the lighting pressure and is short-circuited, when the lamps are fed directly by the battery.

The half of the battery which is being charged, receives its current, at a constant pressure, from the terminals P. In order that this charging current may not be too great, when the battery is empty, a resistance N is permanently situated in the charging circuit.

For the purpose of switching the machine into and out of the lighting circuit at a fixed speed of the train, I employ in my system a centrifugal governor W, which also serves to exchange the halves of the battery after every stoppage. Figs. 1 to 5 show diagrammatically, in what manner this exchange of the batteries at every stoppage may be effected. Every time the balls of the centrifugal governor move apart, and every time they close together again, the ratchet wheel R turns 90° in the same direction, thereby shifting the switches V at the commencement of a run to the left hand position, at the next stoppage again to the center, at the following run into the right hand position, on the subsequent stoppage again to the center, and so on. The changing over of the batteries is necessary to enable that half of the battery which had just supplied the exciting current to be recharged. The governor W operates the switch S, which is omitted in Figs. 1 and 2 in order to simplify those figures. This switch S connects the lamps with the low-tension (Figs. 3 and 4) or high-tension (Fig. 5) terminals of the generator when the generator is running at a sufficient speed, and at other times connects the lamps with both halves of the battery.

Figure 3:
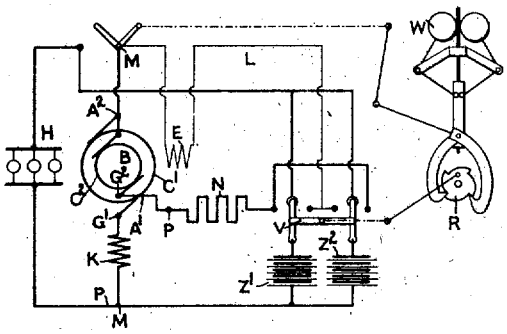

Fig. 3 shows a special example of construction of my train lighting apparatus. The armature B has two windings C′ and C², separated from each other, each with its own collector. The extraneous independent pressure, which is supplied from one of the two halves of the battery, is switched on in opposition to one winding C′ only, while the other winding C², in series with the first, imparts to the charging current of the other battery half the additional rise of pressure required for charging. The exciting coil placed between the winding C′ and the exciting battery Z² excites the generator B directly. The compensating coil K is traversed both by the lighting and by the charging current. N denotes, as in Fig. 1, the reducing resistance in the charging conductor for preventing excessive charging currents.

Figure 4:
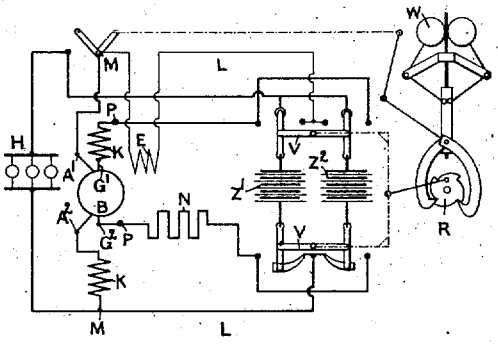
Figure 5:
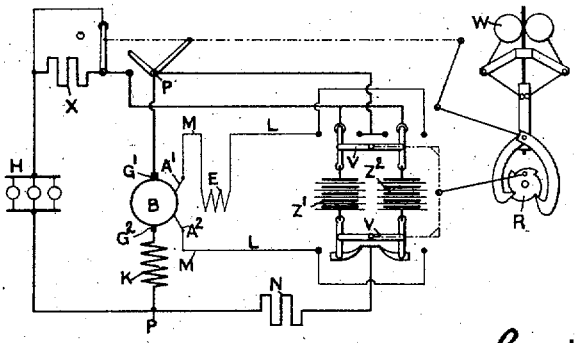

In the examples shown in Figs. 4 and 5 the generator or armature B has only one winding with one collector, on the other hand, however, two pairs of brushes A′, A² and G′, G² are provided. The brushes A′, A², which are in the excitation circuit, embrace fewer armature conductors, than the brushes G′, G² which supply the charging current.

In Fig. 4 the lighting current is taken from the low-tension brushes (A′, A²), in Fig. 5 from the high tension brushes (G′, G²). In the latter case the lamps must have a resistance X switched on in front of them, when the train is running, such resistance being short circuited when the machine is switched off. This may be effected, for instance, by causing the same mechanical motion, which connects the lamps at one time with the battery and another time with the generator, to operate a short circuiting device placed parallel to the resistance X.

The machine may be driven in any desired manner, *e. g.*, off one of the axles of the carriage.

What I claim is:

1. In a car lighting system, in combination, a generator, a plurality of batteries of constant voltage, and means permitting one of said batteries to be charged from the generator while another battery influences the excitation of the generator to maintain the voltage constant, said means being controlled in accordance with the speed of said generator to interchange the connections to the batteries in order that the voltage thereof may be maintained constant.

2. In a car lighting system, in combination, means comprising a generator adapted to supply current simultaneously at a higher and lower voltage, two batteries adapted to supply current at voltages intermediate to those of said generator, a circuit in which said lower voltage and the voltage of one of said batteries may be opposed, a coil inserted in said circuit for influencing the excitation of the generator to maintain the voltage thereof constant, a charging circuit adapted to be supplied by current from said generator at the higher voltage, and means for automatically connecting either one of said batteries to said charging circuit, while the other of said batteries is connected to said first named circuit.

3. In a car-lighting system, in combination, a continuous current generator having two armature windings with separate collectors and two pairs of terminals, one of which, viz., the low-tension pair, embraces only one winding while the other, viz., the high-tension pair, embraces the two windings in series; a storage-battery connected in circuit with the low-tension terminals of the generator; a second storage-battery connected in circuit with the high-tension terminals of the generator; an exciting coil of the generator inserted into the circuit connecting the low-tension terminals of the generator with the first mentioned battery; a circuit connected to said low-tension terminals; and translating devices connected across said last named circuit, substantially as described.

4. A car-lighting system comprising, in combination, a continuous current generator having a compensated armature reaction field; two armature windings with separate collectors and two pairs of terminals, one of which, viz., the low-tension pair, embraces only one of the windings while the other, viz., the high-tension pair, embraces the two windings in series; two extraneous sources of constant voltage; a switching device connected to said sources; contacts for said switching device; a circuit connecting said contacts with said low-tension terminals; a field regulating coil for said generator located in said last named circuit; and means for alternatively actuating said switching device to connect one or the other of said sources of current to said low-tension terminals.

5. A car-lighting system comprising, in combination, a continuous current generator having two armature windings with separate collectors and two pairs of terminals, one of which, viz., the low-tension pair, embraces only one of the windings while the other, viz., the high-tension pair, embraces the two windings in series; a source of constant voltage adapted to be connected in circuit with the low-tension terminals of the generator; a second source of constant voltage adapted to be connected in circuit with the high-tension terminals of the generator; an exciting coil of the generator inserted into the circuit connecting the low-tension terminals of the generator with the said source of constant voltage; and a switching device controlled by said generator adapted to alternatively interchange the connections of said sources with the terminals of said generator in order that the voltage of said sources may be maintained constant.

6. In a car-lighting system, in combination, means comprising a generator adapted to supply current simultaneously at a higher and lower voltage; a source of constant electrical pressure; a circuit in which said lower voltage and said pressure are opposed, said circuit influencing the excitation of the generator to maintain both voltages thereof constant; and a lamp load connected across said circuit.

7. In a car-lighting system, in combination, means comprising a generator adapted to supply current simultaneously at a higher and lower voltage; a battery connected and adapted to oppose said higher voltage; a source of constant electrical pressure; a circuit in which said lower voltage and said pressure are opposed, said circuit influencing the excitation of the generator to maintain both voltages constant; and a lamp load connected across said circuit.

8. In a car-lighting system, in combination, means comprising a generator adapted to supply current simultaneously at a higher and lower voltage; two batteries adapted to supply current at voltages intermediate to those of said generator; a circuit in which said lower voltage and the voltage of one of said batteries may be opposed; a coil inserted in said circuit and adapted to influence the excitation of the generator to maintain the voltage thereof constant; a charging circuit adapted to be supplied by current from said generator at the higher voltage; and means controlled by the speed of the generator whereby either one of said batteries may be connected to said charging circuit while the other of said batteries is connected to said first named circuit.

9. In a car-lighting system, in combination, a generator; a plurality of batteries of constant voltage; and a switch permitting one of said batteries to be charged from the generator while another battery influences the excitation of the generator to maintain the voltage thereof constant, said switch also being adapted automatically to interchange the connections to the batteries in order that the voltage thereof may be maintained constant.

10. In a car-lighting system, in combination, a generator; a load; a plurality of batteries; and means adapted alternatively to carry said load on a plurality of said batteries in parallel or to charge one of said batteries from said generator while another of said batteries influences the generator excitation to maintain the voltage thereof constant; and means controlled in accordance with the speed of said generator to actuate said first named means.

11. In a car lighting system, in combination, a generator, two storage-batteries, a lamp-load, automatic means adapted alternatively to connect said load on said two batteries in parallel or said load and one of said batteries on said generator in parallel, and means independent of the load circuit whereby one battery regulates the generator voltage to maintain the same constant upon the remaining battery being connected in parallel with the load upon the generator.

12. In a car lighting system, in combination, a generator adapted simultaneously to provide sources of current at two different voltages, a storage-battery, a lamp-load, a circuit leading from one of said sources of current for charging said battery and carrying said load, a second storage-battery and a circuit independent of said load, circuits whereby said second battery is connected across the other of said sources of current and regulates the excitation of said generator to maintain the voltage thereof constant, and means affected by the speed of said generator adapted automatically to interchange said batteries.

13. In a car-lighting system, in combination, a generator having two armature windings; two extraneous sources of current; means whereby one of said sources may be connected across a single one of said armature windings; while the other of said sources may be connected across both of said armature windings in series; a low resistance field coil of said generator inserted in circuit between said single armature winding and the source of current connected thereto and adapted to maintain the voltage at terminals of each of said generator windings constant; and a lamp load connected across said single armature winding.

HUGO GROB.

Witnesses:
R. S. Blair,
R. W. France.